US012645756B1

(12) United States Patent (10) Patent No.: US 12,645,756 B1
Borden (45) Date of Patent: *Jun. 2, 2026

(54) UNDERGROUND FLUID FLOW MEASUREMENT

(71) Applicant: RH BORDEN SMART SOLUTIONS, LLC, Lehi, UT (US)

(72) Inventor: Jonathan R. Borden, Holladay, UT (US)

(73) Assignee: RH BORDEN SMART SOLUTIONS, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/310,662

(22) Filed: Aug. 26, 2025

Related U.S. Application Data

(63) Continuation-in-part of application No. 19/264,564, filed on Jul. 9, 2025, now abandoned, which is a continuation of application No. 19/258,448, filed on Jul. 2, 2025, now abandoned, which is a continuation of application No. 19/003,932, filed on Dec. 27, 2024, now Pat. No. 12,380,178, which is a continuation of application No. 18/967,348, filed on Dec. 3, 2024, now abandoned.

(51) Int. Cl.
*G06F 18/213* (2023.01)
(52) U.S. Cl.
CPC .................................. *G06F 18/213* (2023.01)
(58) Field of Classification Search
CPC .................................................... G06F 18/213
USPC ............................................................ 703/9
See application file for complete search history.

(56) References Cited

U.S. PATENT DOCUMENTS 6,522,972 B2 * 2/2003 Helms ...................... E03F 1/00
405/39
7,437,267 B2 * 10/2008 Oka ...................... G06Q 10/06
702/179

(Continued)

OTHER PUBLICATIONS

Wang et al. ("Uncertainty analysis of a pollutant-hydrograph model in assessing inflow and infiltration of sanitary sewer systems", Journal of Hydrology, 2019, pp. 64-74) (Year: 2019).*

(Continued)

*Primary Examiner* — Iftekhar A Khan
(74) *Attorney, Agent, or Firm* — WORKMAN NYDEGGER

(57) ABSTRACT

The present disclosure relates to the measurement of wastewater flow within a conduit using level sensor data in combination with geometric characteristics of the bottom interior surface of the conduit. These geometric characteristics are derived from data obtained using a physical measurement tool, such as a scanner. Using these inputs, flow rate can be determined without requiring confined-space entry or invasive flow instrumentation. The disclosed technology enables technically robust and automated flow measurement by integrating physically obtained wastewater level data with spatially resolved geometric data. This approach allows for accurate application of hydraulic measurement tailored to the specific physical configuration of the conduit. The system accommodates irregular or non-standard conduit geometries and provides a platform for continuous or periodic flow determination with reduced reliance on submerged or contact-based instrumentation.

18 Claims, 5 Drawing Sheets

(56)                   References Cited

U.S. PATENT DOCUMENTS

| | | | | |
|---|---|---|---|---|
| 8,343,310 | B2 * | 1/2013 | Fielding | B01D 17/0217 |
| | | | | 159/901 |
| 8,594,851 | B1 * | 11/2013 | Smaidris | G05D 9/12 |
| | | | | 137/88 |
| 8,983,667 | B2 * | 3/2015 | Smaidris | C02F 3/006 |
| | | | | 137/115.03 |
| 9,090,485 | B2 * | 7/2015 | Adams | C02F 3/30 |
| 9,574,337 | B1 * | 2/2017 | Lang | B01D 21/0012 |
| 9,631,356 | B2 * | 4/2017 | Nesbitt | E03F 3/02 |
| 10,961,139 | B1 * | 3/2021 | Yaman | C02F 3/30 |
| 11,959,238 | B1 * | 4/2024 | Zhang | B09C 1/105 |
| 12,380,178 | B1 | 8/2025 | Borden | |
| 2002/0163089 | A1 * | 11/2002 | La Crosse | B01F 25/53 |
| | | | | 261/76 |
| 2002/0170350 | A1 * | 11/2002 | Schutzbach | E03F 1/00 |
| | | | | 73/195 |
| 2002/0173923 | A1 * | 11/2002 | Schutzbach | G01F 1/002 |
| | | | | 702/45 |
| 2003/0018432 | A1 * | 1/2003 | Helms | E03F 1/00 |
| | | | | 702/5 |
| 2005/0236327 | A1 * | 10/2005 | Gordon | B63B 35/44 |
| | | | | 210/242.1 |
| 2006/0075829 | A1 * | 4/2006 | Maier | G01F 1/662 |
| | | | | 73/861.23 |
| 2009/0090473 | A1 * | 4/2009 | Fielding | B01D 17/0217 |
| | | | | 114/382 |
| 2012/0072196 | A1 * | 3/2012 | Adams | C02F 3/006 |
| | | | | 703/11 |
| 2014/0151310 | A1 * | 6/2014 | Downey | B01D 21/2416 |
| | | | | 210/800 |
| 2014/0291239 | A1 * | 10/2014 | Wang | C02F 3/107 |
| | | | | 210/615 |
| 2014/0324406 | A1 * | 10/2014 | Nesbitt | E03F 3/02 |
| | | | | 703/9 |
| 2016/0025538 | A1 * | 1/2016 | Kim | F02G 1/043 |
| | | | | 73/114.34 |
| 2017/0074793 | A1 * | 3/2017 | Strickler | G02B 26/12 |
| 2018/0017710 | A1 * | 1/2018 | Beck | G01V 20/00 |

| | | | | |
|---|---|---|---|---|
| 2020/0088609 | A1 * | 3/2020 | Beck | G01N 1/2035 |
| 2020/0149262 | A1 * | 5/2020 | Albers | C02F 3/327 |
| 2020/0164288 | A1 * | 5/2020 | Downey | B01D 21/0024 |
| 2021/0317018 | A1 * | 10/2021 | Wanger | A01K 63/045 |
| 2022/0004919 | A1 * | 1/2022 | Zhang | G06F 18/2431 |
| 2022/0228356 | A1 * | 7/2022 | Elag | G06N 3/09 |
| 2022/0274848 | A1 * | 9/2022 | Imahashi | C02F 1/008 |
| 2022/0324737 | A1 * | 10/2022 | Ozair | C02F 9/20 |
| 2023/0017568 | A1 * | 1/2023 | Yu | C02F 1/16 |
| 2023/0106264 | A1 * | 4/2023 | Fudge | H01M 8/16 |
| | | | | 210/615 |
| 2023/0153495 | A1 * | 5/2023 | Louisell, III | G01V 20/00 |
| | | | | 703/11 |
| 2024/0363202 | A1 * | 10/2024 | Louisell, III | G16C 20/70 |

OTHER PUBLICATIONS

Perez at al. ("The sanitary sewer unit hydrograph model: A comprehensive tool for wastewater flow modeling and inflow-infiltration simulations", Water Research, 2024, pp. 15) (Year: 2024).*

Xing et al. ("Sensor placement for robust burst identification in water systems: Balancing modeling accuracy, parsimony, and uncertainties", Advanced Engineering Informatics 51 (2022) 101484, pp. 1-14) (Year: 2022).*

Nguyen et al. (An Intelligent Pattern Recognition Model to Automate the Categorisation of Residential Water End-Use Events, Environmental Modelling & Software, 2012, pp. 1-83) (Year: 2012).*

International Search Report and Written Opinion received for PCT Patent Application No. PCT/US2025/036455, mailed on Aug. 26, 2025, 10 pages.

Karpf et al. (Quantification of groundwater infiltration and surface water inflows in urban sewer networks based on a multiple model approach, water research, 2011, pp. 3129-3136) (Year: 2011).

Non-Final Office Action received for U.S. Appl. No. 19/003,932, mailed on Mar. 19, 2025, 18 pages.

Non-Final Office Action received for U.S. Appl. No. 19/264,564, mailed on Sep. 16, 2025, 17 pages.

* cited by examiner

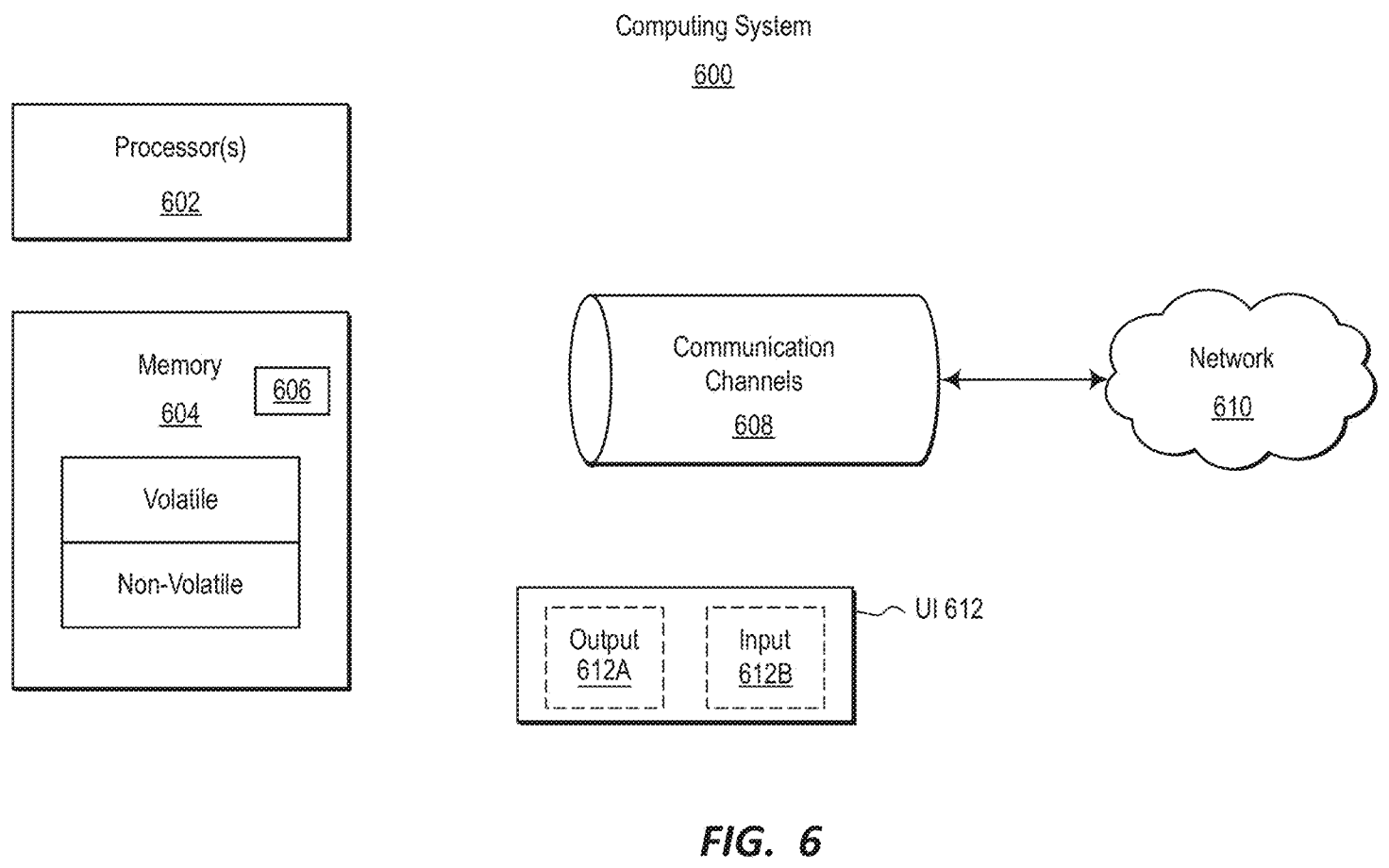

Computing System
600

Network
610

Communication
Channels
608

UI 612

Output
612A

Input
612B

Processor(s)
602

Memory
604

606

Volatile

Non-Volatile

*FIG. 6*

UNDERGROUND FLUID FLOW MEASUREMENT

CROSS-REFERENCE TO RELATED APPLICATION

This application is a continuation-in-part of prior application Ser. No. 19/264,564 filed Jul. 9, 2025, which is incorporated herein by reference in its entirety. Application Ser. No. 19/264,564 is a continuation of prior application Ser. No. 19/258,448, filed Jul. 2, 2025, which is incorporated herein by reference in its entirety. Application Ser. No. 19/258,448 is a continuation of prior application Ser. No. 19/003,932, filed Dec. 27, 2024, which is incorporated herein by reference in its entirety. Application Ser. No. 19/003,932 is a continuation of prior application Ser. No. 18/967,348, filed Dec. 3, 2024, which is also incorporated herein by reference in its entirety.

BACKGROUND

Fluid flow measurement is utilized across a variety of industries, including municipal wastewater management, industrial processes, irrigation, and environmental monitoring. Accurate flow data supports effective management of fluid-handling infrastructure, regulatory compliance, operational efficiency, and environmental protection.

In wastewater collection systems, wastewater from residential, commercial, or industrial sources is conveyed through distributed underground networks to treatment facilities. Accurate measurement of flow rates within these systems aids infrastructure management, regulatory compliance, and prevention of system inefficiencies. Existing flow measurement methods typically involve specialized flow meters that can be costly, difficult to install and maintain, and may pose safety risks due to confined-space entry requirements. Confined-space entry into wastewater conduits particularly exposes workers to hazardous conditions, including the presence of noxious gases. Additionally, the accuracy and reliability of these conventional meters often vary, affecting the quality of data available to system operators.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure relates to the measurement of wastewater flow within a conduit using level sensor data in combination with geometric characteristics of the bottom interior surface of the conduit. These geometric characteristics are derived from data obtained using a non-contact physical measurement tool, such as a scanner, which does not require physical contact with the wastewater itself. Using these inputs, flow rates can be determined without requiring confined-space entry or invasive flow instrumentation. Optionally, geometric characteristics may also be derived from silt measurements within the conduit.

The disclosed technology enables technically robust and automated flow measurement by integrating physically obtained wastewater level data with spatially resolved geometric data. This approach allows for accurate application of hydraulic parameters—such as those based on cross-sectional area, hydraulic radius, and slope—tailored to the specific physical configuration of the conduit. The system accommodates irregular or non-standard conduit geometries and provides a platform for continuous or periodic flow determination with reduced reliance on submerged or contact-based instrumentation.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and details using the accompanying drawings in which:

FIG. 6 illustrates an example computing system in which the principles described herein may be employed.

DETAILED DESCRIPTION

The present disclosure relates to the measurement of wastewater flow rates within a conduit using level sensor data in combination with geometric characteristics of the bottom interior surface of the conduit. These geometric characteristics are derived from data obtained using a physical measurement tool, such as a non-contact scanner, that captures spatial information about the conduit's shape. Using these inputs, flow rate can be determined without requiring confined-space entry or invasive flow instrumentation.

While the present disclosure is described in the context of wastewater conveyed through gravity-driven conduits, the principles described herein may be applied to any underground liquid-carrying conduit where flow rate is a function of level and geometry. Accordingly, although the examples herein focus on wastewater systems, the described techniques may be extended to other fluid transport systems, including stormwater, industrial discharge, or natural channels, so long as the flow behavior can be inferred from level data in conjunction with known geometric characteristics.

Traditional methods for measuring flow in wastewater conduits often rely on intrusive sensors placed directly in the flow stream, such as velocity sensors or area-velocity meters. These methods may require confined-space entry, which introduces significant safety risks and regulatory burdens. They may also be limited in deployment due to cost, maintenance, or vulnerability to debris and fouling. By contrast, the present approach determines flow rate using a level sensor positioned above the flow, in combination with pre-characterized conduit geometry, thereby reducing risk while enabling broader deployment.

The disclosed technology enables robust and automated flow measurement by integrating wastewater level data with spatially resolved geometric data of the actual conduit. This allows for accurate application of hydraulic principles—such as those involving cross-sectional area, hydraulic radius, and slope—tailored to the specific physical configuration of each conduit. The system accommodates irregular or non-standard conduit geometries and supports continuous or periodic flow determination with reduced reliance on submerged or contact-based instrumentation.

Figure 1:
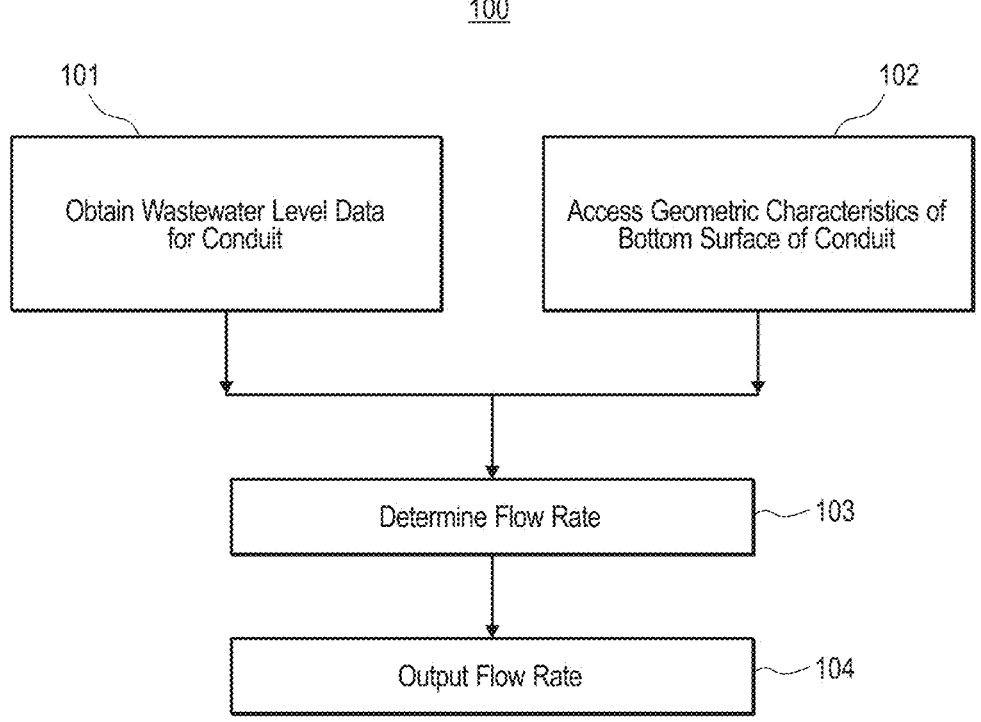
FIG. 1 illustrates a flowchart of a method for measuring a flow rate of wastewater in a wastewater conduit, in accordance with the principles described herein.

FIG. 1 illustrates a flowchart of a method 100 for measuring a flow rate of wastewater in a wastewater conduit, and accordance with the principles described herein. The method 100 includes obtaining wastewater level data from a level sensor installed in the wastewater conduit and positioned underground at a fixed location relative to the conduit (act 101). The level sensor may be, for example, an ultrasonic, radar, or laser-based sensor mounted to or suspended from an access point (e.g., the wall, frame, or cover of a manhole) above the conduit. The level sensor is positioned above the wastewater surface (and typically above the conduit itself) so that the measured distance from the sensor to the wastewater surface serves as a reliable indicator of the wastewater level within the conduit.

Figures 2, 3:
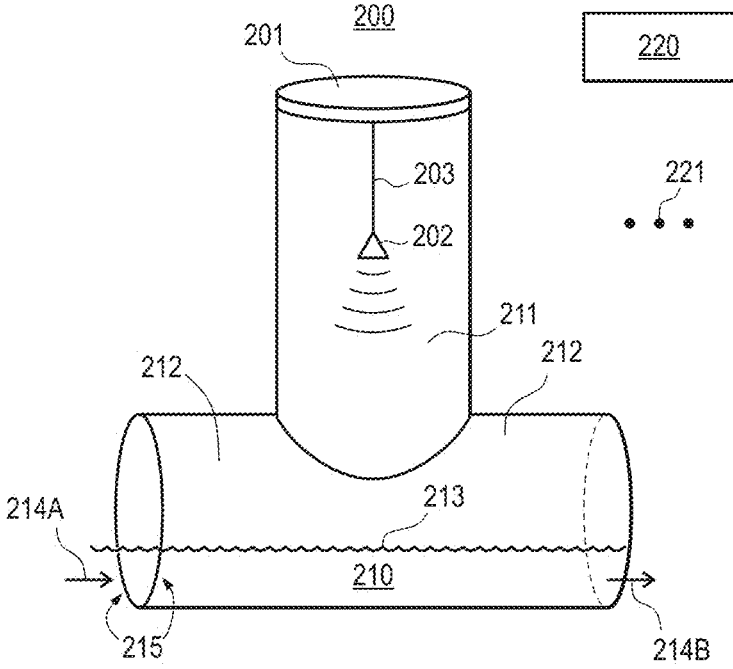
FIG. 2 illustrates an environment that represents an example of an environment in which the method of FIG. 1 may be performed.
FIG. 3 illustrates a flowchart of a setup procedure for preparing to measure a flow rate of wastewater in a wastewater conduit.

FIG. 2 illustrates an environment 200 that represents an example of an environment in which the method 100 may be performed. The environment 200 includes a vertical access point 211 and a horizontal conduit 212. The vertical access point 211 is covered by a cover 201, from which a level sensor 202 is suspended via support 203.

In some cases, the level sensors may be pre-installed at some or all of the access points, such that the wastewater system is permanently instrumented. Alternatively, or in addition, some level sensors may be temporarily installed. For example, modern level sensors are often compact and may be easily installed and removed. Thus, the principles may also be applied to wastewater systems that are temporarily equipped with sensors.

The horizontal conduit 212 has wastewater 210 flowing as represented by the arrows 214A and 214B. The horizontal conduit 212 is termed "horizontal" because it is oriented more horizontally than vertically (i.e., is primarily horizontal in orientation), but the horizontal conduit 212 may have an appropriate slope to ensure proper gravitational flow of wastewater. The wastewater 210 has an upper surface 213 that defines the level of the wastewater. That wastewater 210 covers a lower surface 215 of the horizontal conduit 212. Although not shown in FIG. 2, there may be silt accumulation within the horizontal conduit that settles along the bottom of the horizontal conduit to thereby further define the lower surface 212 of the conduit.

The level sensor 202 outputs a signal (possibly via a wireless connection) representing the distance between the level sensor 202 and the upper surface 213 of the wastewater. From this distance, the level of the wastewater within the horizontal conduit may be derived. This output may be referred to herein as "level data".

The conversion of raw distance data to the level data may be performed locally by the level sensor 202 itself, or may be performed centrally after the distance data is received at a central location, such as a supervisory control and data acquisition (SCADA) system or a cloud-based server. For example, the conversion may be performed at the system 220, which may be remotely located from the access point 211.

The system 220 may be a computing system that acts as a supervisory control and data acquisition (SCADA) system that allows for flow rates to be monitored and for control tasks to be undertaken based on the monitored flow rates. The ellipsis 221 represents that there may be many vertical access points that access different portions of the conduit or different conduits, that may similarly report to the system 220. The system 220 may be configured to perform the method 100 any number of times with respect to any number of access points.

Returning to FIG. 1, the method 100 further includes accessing geometric characteristics of at least a portion of a bottom interior surface of the wastewater conduit (act 102). These geometric characteristics may include, for example, the slope, cross-sectional shape, surface roughness, and dimensional profile of the conduit as a function of depth.

The geometric characteristics are computed by the system 220 from data obtained using a physical measurement tool, such as a scanner, which may generate point cloud data used to construct a three-dimensional digital model of the conduit interior. The physical measurement tool may be a non-contact device capable of scanning the walls of the conduit without making physical contact. In some cases, the point cloud data may have a defined spatial resolution suitable for capturing geometric fidelity of the conduit surface. Optionally, the geometric characteristics may be additionally computed by the system 220 using a silt level measurement for the conduit.

Acts 101 and 102 are shown in parallel in the flowchart to indicate that there is no required order of execution—these acts may occur independently, simultaneously, or in any sequence.

Once the wastewater level data and geometric characteristics have been obtained (acts 101 and 102), the method 100 proceeds to determining the flow rate based on the obtained wastewater level data and the accessed geometric characteristics (act 103). In this description and in the claims, the terms "determination" and "measurement" of a flow rate refers to an estimation based on computerized calculation, recognizing that exact computation of flow rate is limited by practical constraints, such as sensor resolution and environmental variability.

In some implementations, the wastewater level data is used to identify a corresponding cross-section of the conduit, from which hydraulic properties (such as cross-sectional area and hydraulic radius) can be computed based on the stored geometric characteristics. Using these values, flow rate may be estimated by applying hydraulic principles, such as the Manning equation, the Continuity equation, or other empirical or computational flow models. The selected approach may depend on the type of conduit, surface conditions, and the availability of calibration data. This determination may be performed locally by a processor co-located with the level sensor 202, or remotely using cloud-based or centralized processing systems such as the system 220. Furthermore, the determination may be done by using a neural network that is trained as a prediction model to predict flowrate from wastewater level given a wide variety of conduit geometries.

The determined flow rate is then output (act 104). This may involve storing the flow rate data in a local memory (e.g., on-site data logger) or transmitting it to a remote location, such as a supervisory control and data acquisition (SCADA) system or a cloud-based server (such as the system 220), for further analysis, visualization, or integration into broader system operations. In some implementations, the outputted flow rate is monitored for deviations beyond predefined thresholds, which may indicate anomalies such as blockages, surges, or leaks. Upon detecting such deviations, the system may generate alerts or trigger automated responses. Outputting may also include logging flow rates over time for historical recordkeeping, reconciliation with upstream or downstream flow data, or for training predictive models used for diagnostics or system optimization.

In some implementations, the method 100 may be executed multiple times in order to determine flow rate at different time intervals. Execution may occur periodically, such as at fixed intervals (e.g., every minute, hour, or day), to enable ongoing monitoring of wastewater flow conditions over time. This repeated execution supports the generation of time-series data that may be useful to detect long-term trends, support compliance reporting, or optimize system performance.

Alternatively, or in addition, the method 100 may be triggered in an event-driven manner. For example, execution may be initiated in response to weather conditions such as rainfall, snowmelt, or temperatures rising above freezing, each of which may alter flow behavior through increased inflow or infiltration. The method may also be triggered by abrupt changes in measured level, external alerts from supervisory systems, or other system-specific criteria. Alternatively, or in addition, execution may be initiated on demand, such as in response to manual requests by an operator or during scheduled inspection events.

FIG. 3 illustrates a flowchart of a setup procedure 300 for preparing to measure a flow rate of wastewater in a wastewater conduit. The setup procedure 300 includes installing a level sensor at a fixed location relative to the conduit (act 301). The level sensor may be positioned above the wastewater surface—such as on the wall, frame, or cover of an access point (e.g., a manhole) above the conduit—and may be configured to generate level data based on ultrasonic, radar, or laser-based sensing. The sensor may be mounted or suspended and oriented such that the measured distance from the sensor to the wastewater surface provides an accurate indication of wastewater level.

Act 302 includes generating geometric characteristics of at least a portion of the bottom interior surface of the wastewater conduit. These characteristics may be obtained by scanning the interior of the conduit using a physical measurement tool, such as a scanner that generates point cloud data suitable for constructing a digital three-dimensional digital model of the conduit. The model may represent features such as cross-sectional profile, surface roughness, and slope, and may be stored with sufficient spatial resolution to support hydraulic calculations during flow rate determination.

This scanning may be performed even when wastewater is actively flowing through the conduit. In such cases, the scanner may not be able to directly scan portions of the bottom surface that are submerged. When this occurs, the geometric characteristics of the bottom surface may be inferred or estimated based on the portions of the conduit that remain exposed.

For example, the approximation may be rules-based. It may assume that the curvature of the conduit wall leading down to the wastewater continues through the submerged bottom surface, that the slope of the bottom surface follows the general slope observed in the exposed portion of the conduit, and that the surface roughness above the wastewater is representative of the roughness below. In some cases, if increased surface roughness is detected approaching the wastewater surface (suggesting that higher water levels have impacted the conduit wall) then the estimated surface roughness for the submerged area may be scaled accordingly to reflect prolonged exposure to wastewater.

Alternatively, or in addition, the geometry of the conduit below the wastewater level may be approximated using a prediction model trained on real-world conduit data. The prediction model may receive the scanned geometric characteristics of the exposed portion of the conduit and use this information to estimate the geometry of the submerged bottom surface at the time of scanning.

Furthermore, a silt measurement may be taken that allows for the geometry of the submerged bottom surface to be defined by the top surface of the submerged silt. The silt acts as an effective real-world lower boundary of the wastewater cross-section. Thus, the cross-sectional profile of the bottom interior surface of the wastewater conduit may be defined by the top surface of the silt itself, as well as portions of sidewalls of the conduit.

Figure 4:
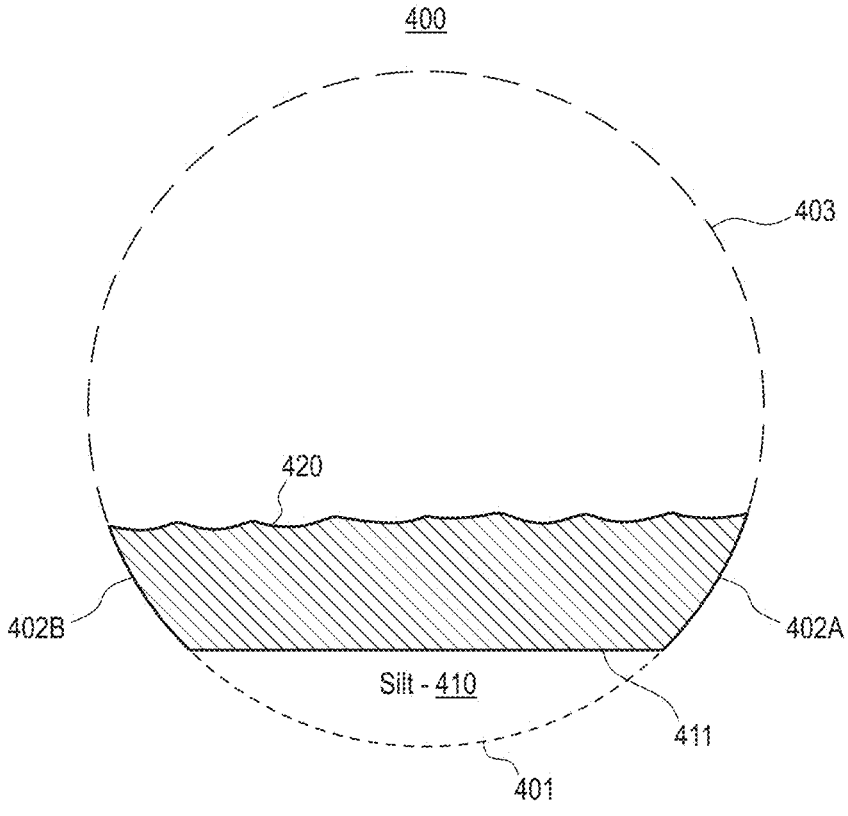
FIG. 4 illustrates an example of a cross-sectional profile 400 of a wastewater conduit 400 that is circular in cross-section.

FIG. 4 illustrates an example of a cross-sectional profile 400 of a wastewater conduit 400 that is circular in cross-section. The overall cross-sectional profile of the conduit is circular. At the time that conduit 400 is scanned, the conduit includes silt 410 that has settled at the bottom of the conduit 300, and wastewater that overlies the silt 410. The wastewater is represented by the area filled with rightward-leaning hatching, and which has a top surface 420.

At the time of scanning, the silt 410 covers a lowest surface 401 of the conduit 400. This silt-covered surface 401 is represented by a dotted-lined curve of the circumference of the conduit 400. There are also sections 402A and 402B of the conduit that are covered by the wastewater at the time of scanning, but not covered by the silt 410. This water-covered surface is represented by the solid-lined curves of the circumference of the conduit. Finally, there is an exposed upper section 403 of the conduit 400 that is above wastewater at the time of scanning. This exposed upper section 403 is represented by a dashed-lined curve of the surface of the conduit 400.

As mentioned above, the scanning tool may only directly obtain a 3-D model of the exposed section 403 of the conduit. However, using the rules-based approach or prediction model described above, the system 220 may approximate a 3-D model of the sections 401 and 402A and 402B of the conduit 400. The silt measurement of the silt 410 may be used to establish a lower portion of any estimated wastewater cross sectional area. The silt-covered section

401 may be disregarded when computing flow, since the silt surface itself functions as the effective lower boundary of the wastewater cross-section.

Accordingly, when computing flows from level data, the cross-section of the waste-water flow may be more accurately measured by taking into account the silt level defining a bottom portion of the cross-section of the waste-water flow. Furthermore, the computation takes into account an approximated 3-D model of even those portions of the conduit that were covered in wastewater at the time that the scan of the conduit was taken.

Acts 301 and 302 are shown in parallel in the flowchart to indicate that there is no fixed temporal dependency between them. Either action may occur first, or they may be performed concurrently. For convenience, both actions may be completed during the same site visit, such as when a conduit is first being instrumented or when access is otherwise available.

In some implementations, one or both of acts 301 and 302 may be periodically repeated. For example, a level sensor may be removed, reinstalled, or serviced during routine maintenance, calibration, or battery replacement. At such times, it may also be convenient to re-perform the geometric scan to capture physical changes in the conduit, such as sediment accumulation, deformation, or repair. The updated scan data may be used to revise the stored geometric characteristics, thereby improving the accuracy of subsequent flow rate determinations. This approach allows the system to remain adaptable over time and to maintain reliable performance as environmental and physical conditions change.

In some cases, the accessed geometric characteristics may indicate that level-based flow rate determination is unreliable for a particular conduit segment. For example, structural anomalies such as the accumulation of hardened debris, sediment buildup, or dried concrete may alter the conduit geometric profile in ways that decouple the observed wastewater level from actual flow rate. In such cases, the system may flag the measurement location for further inspection or correction. Identifying these anomalies through geometric scanning helps ensure that flow rate calculations remain based on accurate and representative physical data. In some cases, the anomalies may cause flow rate estimation to be disregarded or not performed for the access point.

Figure 5:
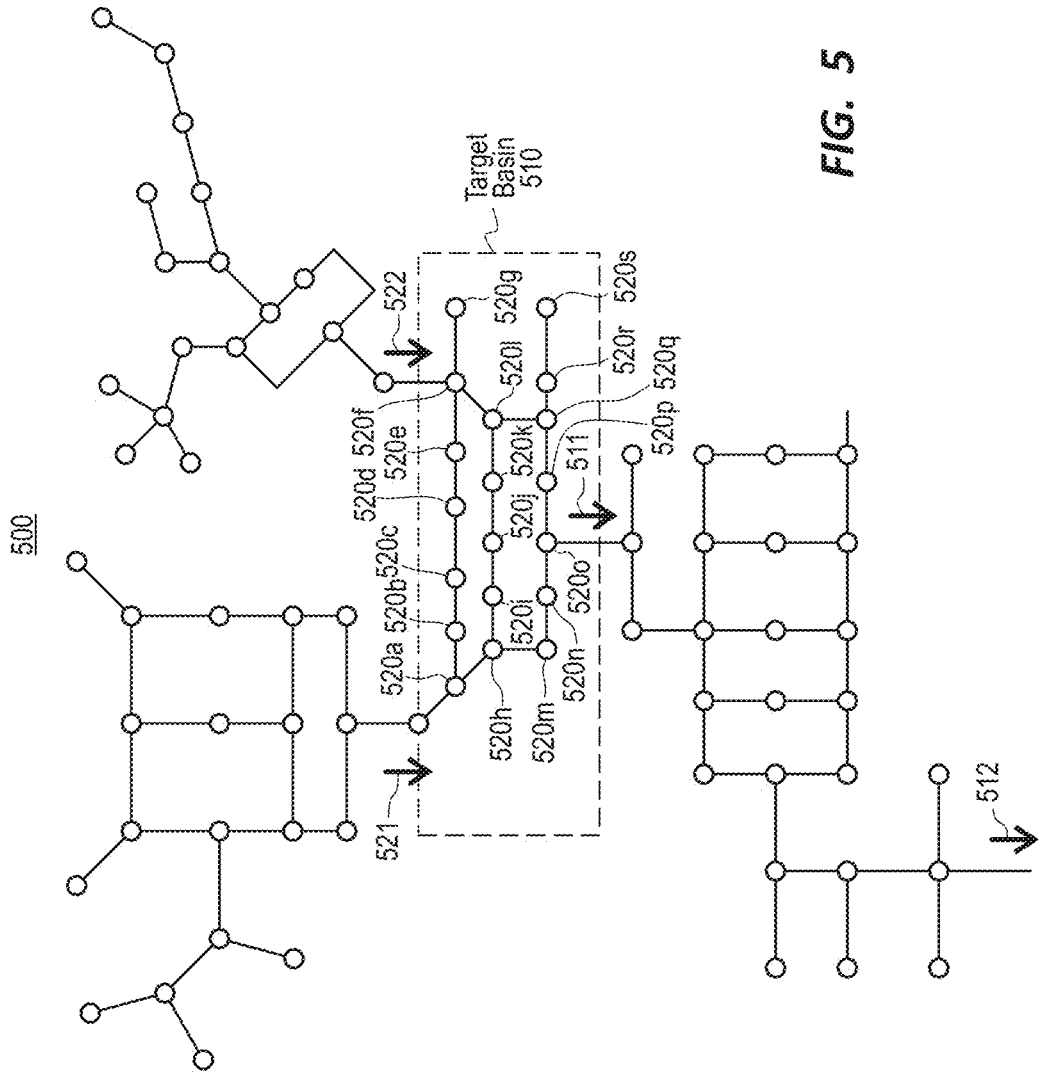
FIG. 5 illustrates a plan view of a geographic distribution of an example wastewater system.

As the principles described herein may be practiced in the context of a wastewater system. To illustrate, FIG. 5 presents a plan view of an example wastewater system 500. This fictional example will be referenced throughout the remainder of the description. Real-world wastewater systems are typically far more intricate and detailed than the simplified example shown in FIG. 5.

Wastewater systems can be extensive, often comprising hundreds or even thousands of linear miles of underground conduit. The example wastewater system 500 is intentionally simplified to illustrate the principles described herein without unnecessary complexity. Of course, this is merely one illustrative example, and the disclosed principles may be applied to any current or future wastewater system.

Referring to FIG. 5, the example wastewater system 500 includes multiple access points, each represented by a circle. These access points may be manholes that provide physical entry to the wastewater system 500. However, the principles described herein are not limited to manholes; other types of access structures may also be used. Level sensors may be installed at some, most, or all of the access points to facilitate flow rate measurement at the respective locations. By way of example, FIG. 5 illustrates a target basin 510 enclosed by a dashed-line box. The target basin 510 includes 19 access points labeled 520a through 520s (collectively referred to as "access points 520"). Each access point corresponds to a conduit segment that is accessible from that location The principles described herein enable flow measurement to be performed at multiple access points within a wastewater system. For example, the methods described above in connection with FIG. 1 may be applied independently at two or more of the access points 520 in the example wastewater system 500. The resulting flow rates at each access point may then be evaluated either individually or in relation to one another to better understand overall system behavior. For instance, flow measurements from upstream and downstream access points may be compared to assess relative contributions or to verify flow consistency across the network. While detailed inflow and infiltration analysis is beyond the scope of this disclosure, coordinated flow measurements across multiple access points can provide a more comprehensive representation of how wastewater moves through the system.

The use of multiple access points with flow measurement capabilities may also support quality control, calibration, or comparative evaluation. For example, measurements from adjacent access points may be compared to detect anomalies in the flow rate measurement for a given conduit segment, confirm measurement accuracy, or assess consistency with expected hydraulic behavior. In some cases, synchronization or temporal alignment of time-series data from different access points may further enhance the utility of these multi-point measurements. Each individual measurement may still be performed according to the same principles described above—based on wastewater level and geometric characteristics. As an example, flow rates from consecutive access points may be averaged to smooth out localized anomalies, and data from suspect access points may be excluded from further analysis (or perhaps just weighted less in the averaging).

In some implementations, flow rate data obtained at one access point may be reconciled with flow rates measured at upstream or downstream access points to improve measurement accuracy. For example, if the measured flow rates at upstream locations are inconsistent with a downstream flow rate, the system may analyze the discrepancy and update one or more of the flow rate estimates to better reflect expected hydraulic continuity across the conduit network. This reconciliation process may be rules-based, model-driven, or informed by historical data patterns to refine the flow rate estimate at the current access point. In this manner, inter-access point data may be used not only for anomaly detection, but also for improving flow rate determinations through active reconciliation. The reconciliation may consider averaging flow rates from adjacent access points while factoring in expected local inflows—such as those from residential or commercial sources—occurring between the access points.

As an example, consider the simplified wastewater system illustrated in FIG. 5. Suppose that the flow rate at access point 520n is being measured. At a particular point in time, preliminary flow rate measurements using the techniques described herein indicate a flow of 2.0 million gallons per day (MGD) at access point 520n. Now suppose that similar measurements are made at upstream access points 520h and 520m, and downstream access point 520o. The preliminary flow rate at access point 520h is measured as 1.6 MGD, the preliminary flow at 520m is measured as 15.3 MGD, and the preliminary flow at 420o is measured as 2.1 MGD.

In this scenario, the preliminary flow rate measurement at access point 520*n* may be refined by evaluating its consistency with contextual upstream and downstream flow rates. Anomalous flow rates—such as the 15.3 MGD measured at 520*m*, which deviates significantly from the nearby 2.0 and 2.1 MGD measurements at 520*n* and 520*o*, respectively—can be flagged for exclusion or weighting less in the average. For example, dried concrete or another obstruction may underlie the wastewater at 420*m*, resulting in inaccurate characterization of the conduit geometry below the wastewater level. These inaccuracies may arise from the inability to fully extrapolate bottom surface geometry from the scanned portions of the conduit that are above the wastewater level.

Accordingly, refinement may involve removing such anomalies and smoothing the remaining measurements in context. In this example, the valid preliminary flow rate measurements—1.6 MGD at access point 520*h*, 2.0 MGD at access point 420*n*, and 2.1 MGD at access point 520*o*—may be averaged or otherwise reconciled, potentially considering expected contributions from intermediate sources such as residential inflows between access points. This reconciliation process may yield final flow rate estimates of, for example, 1.7 MGD at access point 520*h*, 1.9 MGD at access point 520*n*, and 2.1 MGD at access point 520*o*. Thus, flow rate estimation at a given conduit segment may be improved by evaluating measurements in the broader context of the surrounding wastewater system.

Flow measurement using level sensors and geometric models may be implemented using either a distributed or centralized processing approach. For example, data from multiple sensors may be aggregated and processed at a central control center, or each sensor may transmit its data to a cloud-based analytics platform that coordinates flow measurement across the system. This architecture supports scalable deployment of the measurement methodology across diverse and complex wastewater infrastructures, without requiring invasive instrumentation at every point of interest.

In some cases, the geometric characteristics accessed for a given access point may reveal structural anomalies or irregularities that impair the reliability of flow rate estimation. For example, dried concrete, hardened debris, or accumulated obstructions within the conduit may distort the relationship between measured wastewater level and actual flow conditions. Such anomalies can cause level readings to either overstate or understate true flow. When these conditions are detected—whether through initial geometric scanning or subsequent re-scanning—the corresponding access point may be flagged for further inspection, excluded from system analytics, or assigned a reduced weighting in system-wide evaluations. This anomaly detection capability enhances the accuracy, reliability, and diagnostic utility of the described flow measurement methodology.

Accordingly, the principles described herein enable automated estimation of flow rates in wastewater conduits using level sensors in combination with previously scanned geometric characteristics of the conduit. This approach allows for accurate and continuous flow rate monitoring throughout a wastewater system without requiring human access at the time of measurement.

Because the principles described herein may be implemented within a computing environment, an introductory discussion of a computing system is provided with reference to FIG. 6. For example, the system 220 described in FIG. 2 may be implemented as or include a computing system.

Computing systems are now increasingly taking a wide variety of forms. Computing systems may, for example, be handheld devices, appliances, laptop computers, desktop computers, mainframes, distributed computing systems, data centers, virtual machines, neural networks, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit—such as a neural network. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 908 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Literal Claim Support Section

Clause 1. A method for measuring a flow rate of wastewater in a wastewater conduit, the method comprising: obtaining wastewater level data from a level sensor installed in the wastewater conduit and positioned underground at a fixed location relative to the conduit; accessing geometric characteristics of at least a portion of a bottom interior surface of the wastewater conduit, wherein the geometric characteristics are derived from data obtained using a physical measurement tool; determining the flow rate based on (i) the obtained wastewater level data and (ii) the accessed geometric characteristics; and outputting the determined flow rate.

Clause 2. The method of clause 1, wherein the geometric characteristics are derived from data obtained using a non-contact scanner.

Clause 3. The method of clause 1, wherein the geometric characteristics are obtained from a previously generated three-dimensional digital model of at least a portion of the surface of the conduit, the model being generated using point cloud data.

Clause 4. The method of clause 3, wherein the digital model comprises a geometric representation derived from point cloud data having a defined spatial resolution.

Clause 5. The method of clause 1, wherein the geometric characteristics comprise a slope of the bottom interior surface of the wastewater conduit.

Clause 6. The method of clause 1, wherein the geometric characteristics comprise a surface roughness associated with the bottom interior surface of the wastewater conduit.

Clause 7. The method of clause 1, wherein the geometric characteristics comprise one or more cross-sectional dimensions of the bottom interior surface of the wastewater conduit as a function of depth.

Clause 8. The method of clause 1, wherein the flow rate is determined using a hydraulic radius and cross-sectional area derived from the geometric characteristics.

Clause 9. The method of clause 1, further comprising storing the determined flow rate in a local or remote memory for subsequent analysis.

Clause 10. The method of clause 1, further comprising transmitting the determined flow rate to a supervisory control and data acquisition system or a cloud-based server.

Clause 11. The method of clause 1, further comprising monitoring the determined flow rate for deviations exceeding a threshold and generating an alert in response to such deviations.

Clause 12. The method of clause 1, further comprising reconciling the determined flow rate with flow rates computed at a downstream or upstream location to update the determined flow rate.

Clause 13. The method of clause 1, further comprising updating the accessed geometric characteristics using data obtained from a subsequent scan of the conduit performed after the flow rate was first determined.

Clause 14. The method of clause 1, wherein the method is performed periodically to determine flow rate at multiple time intervals.

Clause 15. The method of clause 1, wherein the geometric characteristics include values derived by a prediction model from partial scan data of the conduit interior surface.

Clause 16. A system for measuring a flow rate of wastewater in a wastewater conduit, comprising: a level sensor installed in the wastewater conduit and positioned underground at a fixed location relative to the conduit, the level sensor configured to generate wastewater level data; a memory storing geometric characteristics of at least a portion of a bottom interior surface of the wastewater conduit, wherein the geometric characteristics are derived from data obtained using a physical measurement tool; and a processor operatively connected to the level sensor and to the memory, the processor configured to: (i) determine the flow rate based on the wastewater level data and the geometric characteristics; and (ii) output the determined flow rate.

Clause 17. The system of clause 16, wherein the level sensor is mounted to a wall or frame of an access point cover positioned above the wastewater conduit.

Clause 18. The system of clause 16, wherein the level sensor is mounted to or hanging from an access point cover positioned above the wastewater conduit.

Clause 19. The system of clause 16, wherein the level sensor is an ultrasonic, radar, or laser-based level sensor.

Clause 20. An apparatus for determining a flow rate of wastewater in a wastewater conduit, comprising: an interface configured to receive wastewater level data from a level sensor installed in the wastewater conduit; a memory storing geometric characteristics of at least a portion of a bottom interior surface of the wastewater conduit, wherein the geometric characteristics are derived from data obtained using a physical measurement tool; and one or more processors configured to: (i) determine the flow rate based on the wastewater level data and the geometric characteristics; and (ii) output the determined flow rate.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A method for remote monitoring wastewater flow occurring at respective measurement times within a wastewater conduit of a wastewater network without entering the wastewater network at the respective measurement time, the wastewater network having a plurality of access points for accessing the wastewater conduit, the method comprising:

for each of multiple of the plurality of access points:

1) at a respective scanning time prior to a respective measurement time, scanning at least a part of a scannable portion of a bottom interior surface of the wastewater conduit at the respective access point to thereby obtain respective geometric scanning output data;

2) using the respective geometric scanning output data to digitally model a portion of the wastewater conduit that was submerged at the scanning time to thereby form a respective digital submerged model; and 3) forming a respective digital surface model of the wastewater conduit using at least a portion of the respective digital submerged model and at least a portion of the respective geometric scanning output data;

4) at the respective measurement time, obtaining respective wastewater level data from a respective level sensor installed in the respective access point;

5) determining a respective digital estimation of a flow rate corresponding to the respective measurement time at the respective access point based on (i) the respective wastewater level data corresponding to the respective measurement time and (ii) the respective digital surface model; and 6) reporting the respective digital estimation in a wastewater monitoring system for monitoring a status of the wastewater network across the multiple access points.

2. The method of claim 1, wherein the physical measurement tool comprises a non-contact scanner.

3. The method of claim 1, wherein the geometric scanning output data comprise point cloud data.

4. The method of claim 3, wherein the digital surface model comprises a geometric representation derived from the point cloud data.

5. The method of claim 1, wherein the digital surface model represents a slope of the bottom interior surface of the wastewater conduit.

6. The method of claim 1, wherein the digital surface model represents a surface roughness associated with the bottom interior surface of the wastewater conduit.

7. The method of claim 1, wherein the digital surface model represents one or more cross-sectional dimensions of the bottom interior surface of the wastewater conduit as a function of depth.

8. The method of claim 1, wherein the flow rate is estimated using a hydraulic radius and cross-sectional area derived from the digital surface model.

9. The method of claim 1, further comprising monitoring the respective digital estimations for deviations exceeding a threshold and generating an alert in response to such deviations.

10. The method of claim 1, further comprising forming the digital estimation by reconciling the initial digital estimation with digital estimations of flow rates computed at downstream or upstream access points.

11. The method of claim 1, further comprising updating the respective digital surface model for a particular access point using data obtained from a subsequent scan of the bottom interior surface of the wastewater conduit at the particular access point.

12. The method of claim 1, wherein the method is performed periodically to obtain reports at multiple time intervals.

13. The method of claim 1, wherein the digital surface model includes values derived by a prediction model from partial scan data of the conduit interior surface.

14. A system for remote monitoring wastewater flow within a wastewater network without requiring entry into the wastewater network at respective measurement times, comprising:

a plurality of level sensors, each level sensor installed in a respective access point of a plurality of access points of the wastewater network and configured to generate respective wastewater level data at respective measurement times;

a memory storing, for each of the plurality of access points, (i) geometric scanning output data obtained by scanning, at a respective scanning time prior to the respective measurement time, at least a part of a bottom interior surface of a wastewater conduit at the respective access point using a physical measurement tool;

(ii) a respective digital submerged model formed by digitally modeling, based on the geometric scanning output data, a portion of the wastewater conduit that was submerged at the respective scanning time; and (iii) a respective digital surface model of the wastewater conduit formed using at least a portion of the respective digital submerged model and at least a portion of the geometric scanning output data, the digital surface model representing at least a portion of the wastewater conduit that is submerged and not directly measurable at the respective measurement time; and a processor operatively connected to the plurality of level sensors and to the memory, the processor configured to:

(i) determine, for each of the plurality of access points, a respective digital estimation of a flow rate corresponding to the respective measurement time based on (a) the respective wastewater level data corresponding to the respective measurement time and (b) the respective digital surface model; and (ii) report the respective digital estimation to a wastewater monitoring system for monitoring a status of the wastewater network across the plurality of access points at the respective measurement time.

15. The system of claim 14, wherein, for at least one of the plurality of access points, the level sensor is mounted to a wall or frame of an access point cover positioned above the wastewater conduit.

16. The system of claim 14, wherein, for at least one of the plurality of access points, the level sensor is mounted to or suspended from an access point cover positioned above the wastewater conduit.

17. The system of claim 14, wherein, for at least one of the plurality of access points, the level sensor is an ultrasonic, radar, or laser-based level sensor.

18. An apparatus for remote monitoring wastewater flow within a wastewater network without requiring entry into the wastewater network at respective measurement times, comprising:

an interface configured to receive respective wastewater level data from a plurality of level sensors installed in a plurality of access points of the wastewater network, the respective wastewater level data being obtained at respective measurement times;

a memory storing, for each of the plurality of access points:

(i) geometric scanning output data obtained by scanning, at a respective scanning time prior to the respective measurement time, at least a part of a bottom interior surface of a wastewater conduit, at the respective access point using a physical measurement tool;

(ii) a respective digital submerged model formed by digitally modeling, based on the geometric scanning output data, a portion of the wastewater conduit that was submerged at the respective scanning time; and (iii) a respective digital surface model of the wastewater conduit formed using at least a portion of the respective digital submerged model and at least a portion of the geometric scanning output data, the digital surface model representing at least a portion of the wastewater conduit that is submerged and not directly measurable at the respective measurement time; and one or more processors configured to:

(i) determine, for each of the plurality of access points, a respective digital estimation of a flow rate corresponding to the respective measurement time based on (a) the respective wastewater level data corresponding to the respective measurement time and (b) the respective digital surface model; and (ii) report the respective digital estimation to a wastewater monitoring system for monitoring a status of the wastewater network across the plurality of access points.

* * * * *